UNITED STATES PATENT OFFICE.

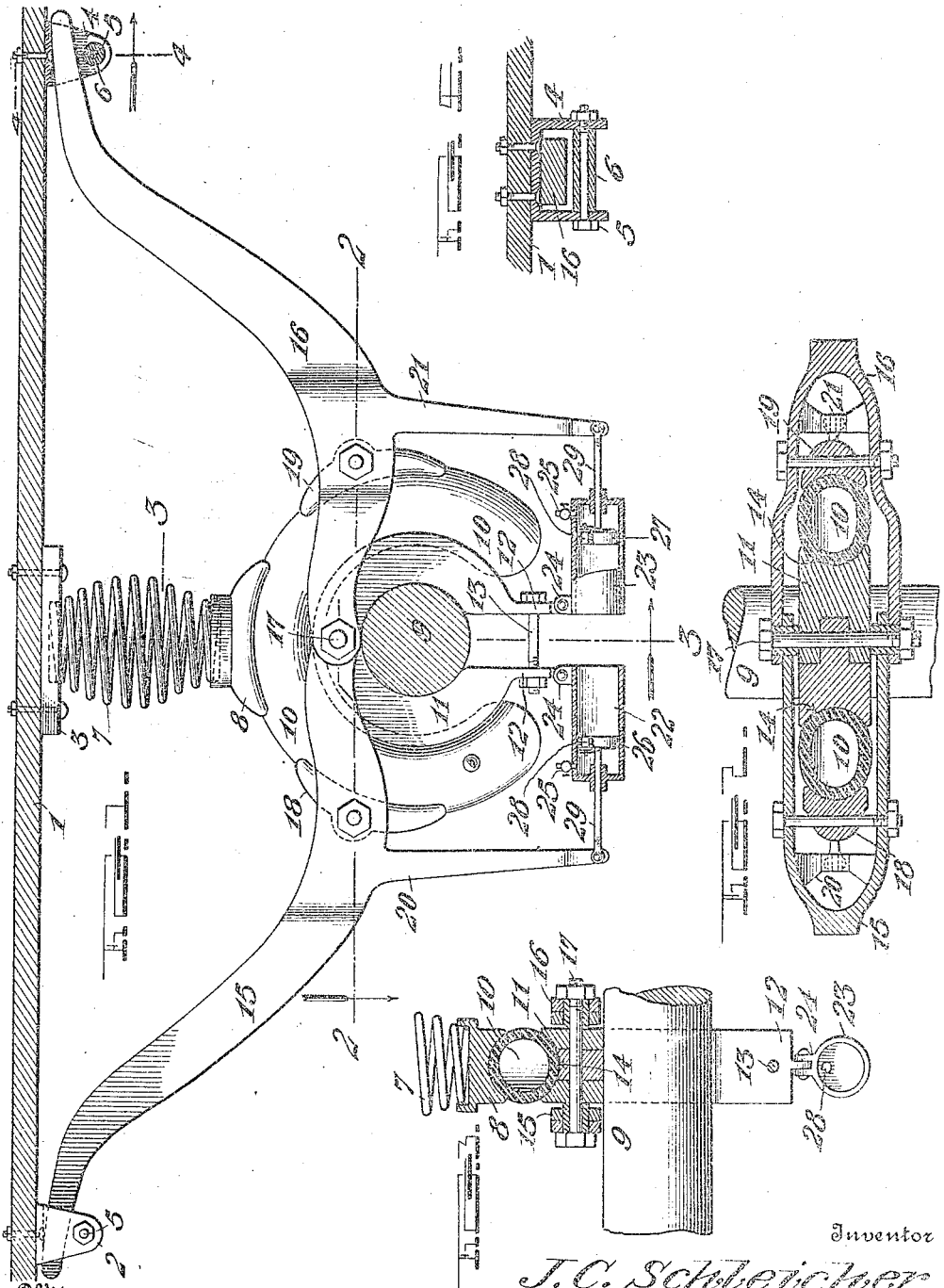

JOHN C. SCHLEICHER, OF MOUNT VERNON, NEW YORK.

COMBINED CUSHION-SPRING AND SHOCK-ABSORBER.

1,136,489.  Specification of Letters Patent.  Patented Apr. 20, 1915.

Application filed February 5, 1914. Serial No. 816,805.

*To all whom it may concern:*

Be it known that I, JOHN C. SCHLEICHER, a citizen of the United States, residing at Mount Vernon, in the county of Westchester and State of New York, have invented certain new and useful Improvements in Combined Cushion-Springs and Shock-Absorbers; and I do declare the following to be a full, clear, and exact description of the invention, such as will enable others skilled in the art to which it appertains to make and use the same.

This invention relates to pneumatic spring checks or shock absorbers which also perform the function of a cushioning spring.

The object of the invention is to provide a simply constructed and efficient device of this character especially designed for use upon automobiles, motor trucks, and similar vehicles.

Another object of the invention is to provide a device of this character in which the point of contact of the actuating levers is variable for increasing or decreasing the leverage thereof.

With these and other objects in view, the invention consists in certain novel features of construction, and the combination and arrangement of parts, as will be more fully described and claimed.

In the accompanying drawings: Figure 1 represents a side elevation partly in section of this improved shock absorber applied to the bottom of a vehicle; Fig. 2 is a horizontal section taken on the line 2—2 of Fig. 1; Fig. 3 is a vertical section taken on the line 3—3 of Fig. 1; Fig. 4 is a detail vertical section taken on the line 4—4 of Fig. 1.

In the embodiment illustrated, the bottom 1 of a vehicle is shown having longitudinally spaced hangers 2 and 4, being substantially inverted U-shaped in form. The free ends of the legs of each hanger are connected by a bolt 5 on which between said legs is mounted a sleeve 6 which performs the function of a spacer for the legs and also as a revoluble bearing for a lever to be described, said sleeve being loosely mounted on said bolt. The central hanger 3 supports a coil spring 7 having a shoe 8 secured to its free end for a purpose to be described. An axle 9 is supported on the vehicle by suitable means not shown, and around said axle is disposed a substantially annular or arcuate pneumatic cushion 10 by means of a hub 11 which is provided with laterally extending apertured ears 12 connected by a clamping bolt 13 which secures said hub firmly on the axle. This hub is preferably composed of two hingedly connected sections and is provided with a peripheral groove 14 which forms a seat for the cushioning element 10.

The spring pressed shoe 8 bears on the periphery of the cushion 10 at a point midway its ends and is designed to hold said cushion seated and prevent bulging at this point, it being obvious that the shoe 8 may be made of any desired length to contact with more or less of the cushion as may be desired. The free ends of this cushion terminate adjacent the ears 12 of the hub, being spaced slightly therefrom a sufficient distance to permit of their expansion when pressure is exerted on the cushion without bringing said ends into contact with the securing ears. Oppositely extending levers 15 and 16 in the form of compound or ogee curves are fulcrumed at one end of the hub 11, preferably by means of the bolt 17, which performs the double function of a hinge pintle for the hub sections, and as a fulcrum for the levers. The free ends of these levers incline slightly upward and are slidably engaged with the hangers 2 and 4, the point of contact being variable, as will be hereinafter described. The connected ends of these levers 15 and 16 are bifurcated to straddle the hub 11 and cushion 10, as is clearly shown in Fig. 2.

Segmental or arc-shaped shoes 18 and 19 are pivotally mounted between the arms of the bifurcated inner ends of the levers 15 and 16 in position to engage opposite sides of the cushion 10 on the periphery thereof, as is shown clearly in Figs. 1 and 2. Arms 20 and 21 extend downwardly from the levers 15 and 16, preferably at the crotches thereof and these arms are bifurcated at their inner ends and merge at their free outer ends into a single member and are designed for a purpose to be described.

Shock absorbing air cylinders 22 and 23 are pivotally mounted at one end on the ears 12, preferably by means of laterally extending apertured lugs 24 whereby the inner ends of said cylinders are supported by and pivotally mounted on the hub 11. These cylinders 22 and 23 are open at their inner ends and closed at their outer ends and are preferably provided near said closed ends with valve controlled vent openings 25. Pistons 26 and 27 are slidably mounted in these cylinders 22 and 23 and are provided with valved openings 28, the valves of which are preferably spring controlled and are adapted to open outwardly toward the closed ends of the cylinders. Piston rods 29 are secured at one end to the pistons 26 and 27 and the opposite ends thereof are pivotally connected with the free ends of the arms 20 and 21 of the levers 15 and 16. The pivotal connection of the piston rod with these arms and of the lugs 24 with the ears 12, permits the movement of the levers, as will be described.

With the parts constructed as above described and in the position shown in Fig. 1, when sudden pressure is exerted on the bottom 1 of the vehicle, the spring 7 will be compressed, causing the vehicle bottom to lower on the free ends of the lever arms 15 and 16, thereby causing said levers to move outwardly in the hangers 2 and 4, thereby changing the point of contact of said levers with said hangers and shortening the levers and causing their fulcrumed ends to move inwardly whereby the shoes 18 and 19 engage and compress the cushioning member 10; simultaneously the pistons 26 and 27 are forced toward the open ends of the cylinders 22 and 23 during which movement the spring pressed valves 28 are opened and the air in the cylinders forced therethrough behind the pistons. When the rebound occurs and the pistons move rearwardly toward the closed ends of the cylinders, the air in said cylinders behind said pistons is forced slowly out through the valve controlled vent openings 25 whereby the shock is absorbed.

From the foregoing description, it will be seen that the sudden shocks imparted to the vehicle and the wheels thereof are absorbed by the pneumatic check mechanism above described, which acts in conjunction with the other supporting spring preventing said springs from acting too suddenly and also relieving the strains thrown on the springs when the wheels drop suddenly into a deep rut or strike a serious obstruction.

I claim as my invention:

1. A combined cushioning spring and shock absorber comprising an axle engaging element, a pneumatic cushioning spring mounted on said element, levers fulcrumed at one end on said axle engaging element and having shoes for engagement with said cushioning element, shock absorbing cylinders, pistons carried by said levers and slidably mounted in said cylinders, and means for slidably supporting the free ends of said levers.

2. A combined cushioning spring and shock absorber comprising an axle engaging element, a pneumatic cushion mounted on said element, levers fulcrumed at one end on said axle engaging element and having their opposite ends curved upwardly and outwardly, means adapted to be secured to a vehicle body for slidably supporting the free ends of said levers, shock absorbing cylinders mounted on said axle engaging element, depending arms on said levers, pistons slidable in said cylinders and piston rods connected with said pistons and with the free ends of said arms.

3. A combined cushion spring and shock absorber comprising a substantially annular hub adapted to be mounted on a vehicle axle and having a peripheral groove, a substantially annular pneumatic cushion seated in said groove, a spring pressed shoe for engagement with said annular cushion to hold it seated in said groove and to prevent bulging thereof, levers fulcrumed at one end on said hub and provided with shoes positioned to engage said cushion at opposite sides thereof, hangers adapted for attachment to a vehicle body and to receive the free ends of said levers whereby said lever ends are slidably mounted relatively to said hangers, shock absorbing cylinders carried by said hub and having pistons slidable therein, said pistons being provided with outwardly opening spring pressed valves, said cylinders having vent openings at their outer or rear ends, and means for connecting said pistons with said levers.

4. A combined cushion spring and shock absorber comprising a substantially annular hub adapted to be mounted on a vehicle axle and having a peripheral groove, a substantially annular pneumatic cushion seated in said groove, a spring pressed shoe for engagement with said annular cushion to hold it seated in said groove and to prevent bulging thereof, levers fulcrumed at one end on said hub and provided with shoes positioned to engage said cushion at opposite sides thereof, hangers adapted for attachment to a vehicle body and to receive the free ends of said levers, whereby said lever ends are slidably mounted relatively to said hangers, shock absorbing cylinders carried by said hub and having pistons slidable therein, said pistons being provided with outwardly opening spring pressed valves, said cylinders having vent openings at their outer ends, means for connecting said pistons with said levers, said cylinders being pivotally supported at their opposite ends.

5. A combined cushioning spring and shock absorber comprising an axle engaging hub formed in hingedly connected sections and having a peripheral groove therein, an arcuate cushioning member seated in said groove, means for holding said cushioning member in said groove, levers having bifurcated inner ends fulcrumed on said hub, the arms of said levers spanning said hub and cushioning member, cushion engaging shoes pivotally mounted in the crotches of said levers, arms depending from said levers, means for slidably supporting the free ends of said levers, shock absorbing cylinders pivotally mounted at one end on said hub, valved pistons slidable in said cylinders, and vent openings at the closed outer ends of said cylinders, and piston rods fixed to said pistons and pivotally connected with the arms of said levers.

6. The combination with a vehicle body having longitudinally spaced hangers secured to the bottom thereof, a hub engaging the axle of said vehicle and comprising arcuate sections hingedly connected at one end and provided with outwardly extending laterally projecting apertured lugs at their free ends, a bolt engaging said lugs for clamping said hub sections to said axle, said hub having a peripheral groove therein, a substantially annular cushioning member seated in said groove, a coil spring mounted on one of the hangers of said vehicle body and provided at its free end with a cushion engaging shoe arranged midway the ends of said cushioning member, levers in the form of ogee curves having their inner ends bifurcated and fulcrumed on the pintle which connects the sections of said hub, the arms of said bifurcated ends spanning said hubs and the cushioning member mounted thereon, cushion engaging shoes pivotally mounted on said levers in the crotches thereof, the free ends of said levers being slidably engaged with two of the hangers on said vehicle body and extending in opposite directions, rigid arms depending from said levers, shock absorbing cylinders closed at one end and open at the other, means for pivotally connecting the open ends of said cylinders with said hub sections, valved pistons slidably mounted in said cylinders, said cylinders having valve controlled vent openings near their closed outer ends, and piston rods rigidly connected with said pistons and slidably mounted in said cylinders, the outer ends of said piston rods being pivotally connected with the free ends of the lever carried arms.

In testimony whereof I have hereunto set my hand in presence of two subscribing witnesses.

JOHN C. SCHLEICHER.

Witnesses:
   EDW. A. PARTCH,
   ERWIN C. SCHLEICHER.